United States Patent [19]
Seike

[11] 3,900,784
[45] Aug. 19, 1975

[54] CONVERTER FOR BATTERY CHARGER

[75] Inventor: Helmut K. Seike, Toledo, Ohio

[73] Assignee: Eltra Corporation, Toledo, Ohio

[22] Filed: July 10, 1974

[21] Appl. No.: 487,011

[52] U.S. Cl................. 320/6; 320/17; 320/39; 321/18
[51] Int. Cl.............................................. H02j 7/14
[58] Field of Search............ 320/2, 6, 7, 15–19; 322/28; 321/2, 18

[56] References Cited
UNITED STATES PATENTS

| | | | |
|---|---|---|---|
| 3,206,610 | 9/1965 | Lovrenich | 320/15 X |
| 3,541,420 | 11/1970 | Rees | 321/2 X |
| 3,667,025 | 5/1972 | Campbell et al. | 320/15 |

*Primary Examiner*—J. D. Miller
*Assistant Examiner*—Robert J. Hickey
*Attorney, Agent, or Firm*—Oliver E. Todd, Jr.

[57] ABSTRACT

In a vehicle having a main battery and a charger for such main battery, an improved converter for charging an auxiliary battery while such auxiliary battery is connected in series with the main battery. Power from the main battery and charger is applied through a multivibrator to a power transformer having a rectified output connected for charging the auxiliary battery. When the current to the transformer exceeds a predetermined level, the frequency of the multivibrator is dependent upon the charging current up to a maximum frequency which limits the maximum charging current. Below the predetermined current level, the charging current to the auxiliary battery decreases as the voltage across the auxiliary battery increases. The converter is cycled on and off in response to the voltage across the auxiliary battery when in a charged state. Hysteresis is provided in a voltage sensing circuit which cycles the converter off at a predetermined high voltage and on at a predetermined lower voltage.

11 Claims, 1 Drawing Figure

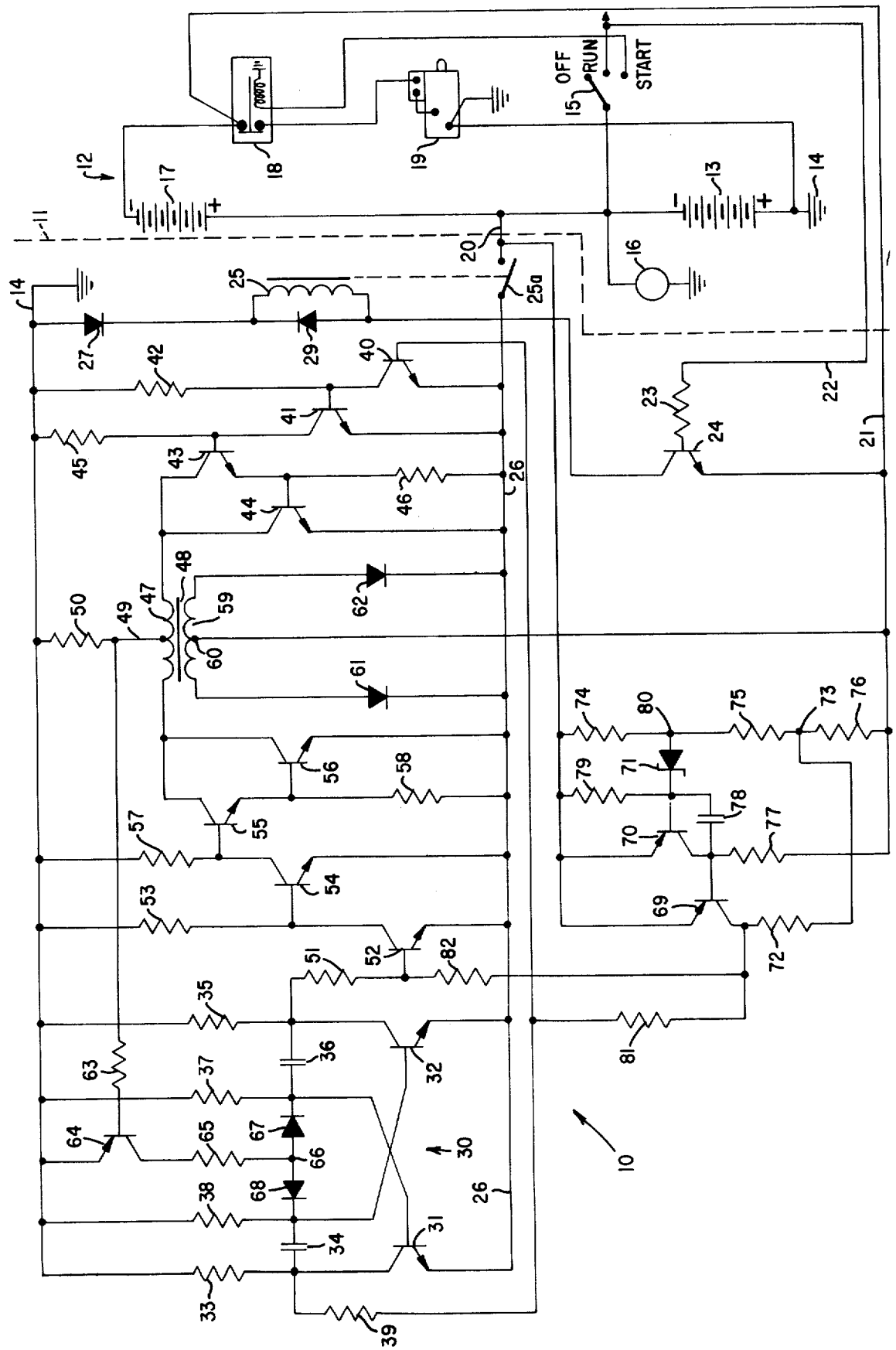

CONVERTER FOR BATTERY CHARGER

BACKGROUND OF THE INVENTION

This invention relates to battery charging systems for use with internal combustion engines and more particularly to an improved charging system for auxiliary batteries connected in series with a main battery to provide a higher than normal voltage for starting an internal combustion engine such as a diesel truck engine under cold ambient conditions.

Under cold ambient conditions, where temperatures on the order of 0°F. or less may be typical, the starting conditions for large diesel truck engines presents a burdensome problem due to the increased current requirements for starting cold engines and due to a decrease in battery efficiency at low temperatures. One solution to this problem involves connecting one or more auxiliary batteries in series with the main truck battery to obtain a relatively high voltage of perhaps twice that of the standard electrical system in the truck. The high voltage is applied to the starting motor to give the additional torque required for turning over the engine at speeds adequate to insure starting thereof and to reduce the battery current requirements. The auxiliary batteries must necessarily be charged in order to resupply the energy which has been drawn from them during the starting operation, so that they will not be depleted for the next starting operation.

In the past, an auxiliary battery has commonly been connected in a parallel arrangement with the main truck battery so that the charging voltage in a standard electrical circuit for the truck could be utilized directly for charging such auxiliary battery which is used solely for the starting operation. Generally, an electromechanical series-parallel switch has been provided for changing the connections of the auxiliary and main batteries from a starting circuit where the batteries are in series to a parallel connection when the batteries were charged from the standard electrical system of the truck. These series-parallel switches were necessarily of a robust construction inasmuch as currents on the order of 2,000 amps were sometimes carried by their contact points during the starting operation. Mechanical contact motion and high contact currents cause relatively short life times for the switches. The switches required periodic attention to keep the electrical resistance to the high currents at a minimum and in order that their efficiency remained high. However, the adverse environment necessitates sealing the switches and, therefore, they generally cannot be serviced in the field. Furthermore, the electrical wiring and cable connections to the switch are complex. The switch cannot be easily replaced by the average mechanic unless great care is exercised to prevent erroneous connections.

An improved converter for charging an auxiliary battery while such auxiliary battery is left in series with a main truck battery is disclosed within U.S. Pat. No. 3,206,610 which issued to Roger T. Lovrenich on Sept. 14, 1965. The converter disclosed in this patent includes a pair of power transistors and an RC network connected for pulsating the primary winding of a power transformer with energy from the main truck battery and a conventional charging circuit connected thereto. The output of the power transformer is rectified and used for charging the auxiliary battery while such auxiliary battery remains in series with the main battery. The converter, which is self-oscillating, is inherently protected against damage caused by high currents resulting from, for example, shorted output loads. This self-protection results from excessive currents inhibiting the converter from oscillating. Of course when oscillation is inhibited, no charging current will be delivered to the auxiliary battery. Although the converter described in U.S. Pat. No. 3,206,610 provides an improved means for charging an auxiliary battery, it does not take into account all possible battery requirements which are dependent upon various conditions such as battery age and state of charge. Operating conditions may occur at which the demand for output power exceeds the designed capability of the converter. For example, this is the case when one cell of the auxiliary battery under charge is shorted, as by internal deposits in an aged battery which partially short the spaces between the battery plates. Since the secondary voltage is much lower than the converter output under this condition, a much higher output current demand will occur which will in turn force the power transistors out of a preset saturation, thus causing excessive heat losses and possibly resulting in the destruction of the power transistors.

SUMMARY OF THE INVENTION

According to the present invention, an improved converter is provided for charging an auxiliary battery while it is connected in series with a main battery in a truck or similar type vehicle. The converter includes means for controlling the charging current delivered to the auxiliary battery to initially provide a predetermined maximum charging current to an uncharged battery. After the battery becomes charged, the converter is periodically cycled on and off at a rate sufficient to maintain the battery in a fully charged state. On-off cycling of the converter is dictated by the battery's terminal voltage which is related to battery conditions including age, ambient temperature, power requirements for starts, starting occurrence, etc. The converter can be adapted to reduce the charging current as the auxiliary battery becomes charged.

The auxiliary battery charging converter includes a multivibrator which alternately applies opposite polarity direct current pulses to sides of a center tapped primary winding in a power transformer. The rectified output of the power transformer is used for charging the auxiliary battery. While charging the auxiliary battery, the converter will deliver a charging current which is either constant or decreases from a predetermined maximum current as the auxiliary battery becomes charged. If the output terminals of the converter are shortcircuited or if the auxiliary battery is depleted to an extent that it calls for more than the predetermined maximum charging current, the converter will approach a constant current source. This is achieved by means of a current sensor which increases the frequency of the multivibrator as current within the power transformer exceeds the predetermined maximum current. The impedance across the secondary winding of the power transformer, which is related to the charging current needs of the auxiliary battery, is reflected to the primary winding. An increased demand for charging current results in a decrease in the primary winding impedance. However, the simultaneous frequency increase is effective in limiting the primary current and as a consequence the charging current is limited.

A circuit is also provided for sensing the voltage appearing across the auxiliary battery. When the auxiliary battery becomes fully charged, its voltage will reach a predetermined high voltage level. At this point, the converter is turned off by the voltage sensor. When the voltage across the battery again drops below a predetermined lower voltage, the converter is again turned on. Thus, hysteresis in the voltage sensing circuitry will maintain a full charge on the auxiliary battery without resulting in an excessive amount of water evaporation.

Accordingly, it is a preferred object of the invention to provide an improved converter for charging an auxiliary battery while it is connected in series with a main battery in a truck for use in starting the truck engine.

Another object of the invention is to provide a converter for charging an auxiliary battery in a truck which includes a control over the charging current delivered to such battery.

Still another object of the invention is to provide a converter for charging a battery from a direct current source which includes a constant current region of operation, and may also include provisions for providing a tapered charge to the battery as the batter becomes charged, and includes provisions for maintaining such battery in a fully charged state.

Other objects and advantages of the invention will become apparent from the following detailed description, with reference being made to the accompanying drawing.

BRIEF DESCRIPTION OF THE DRAWING

The single FIGURE is a detailed circuit diagram of a converter connected for charging an auxiliary battery while it is connected in series with a main battery for starting a truck engine or some other purpose requiring a voltage higher than that available from the main battery.

DESCRIPTION OF THE PREFERRED EMBODIMENTS

Turning now to the single drawing, an improved converter 10 is shown for charging a battery from a direct current source. In the following, the converter 10 will be described for use with a vehicle and in particular with a truck. A dashed line 11 is shown separating the converter 10 from the existing electrical system 12 within the truck. The electrical system 12 in the truck includes a main or "A" battery 13 (typically twelve volts) which supplies electrical power for normal operation of the truck or other electrical system. The battery 13, for example, supplies electrical power to an engine ignition system and to various other electrical components such as meters, gauges, lights, a radio, etc. The main battery 13 is connected between a common vehicle ground 14 and an ignition key switch 15 which controls starting and running of the truck. The circuit is shown for a positive ground system. However, it will be readily apparent to those skilled in the art that the circuit may be modified for negative ground operation. An alternator, generator or similar type charging system 16 is connected for charging the main battery 13. A conventional voltage regulator (not shown) may be connected in series with or to the field winding of the alternator 16 for regulating the charging current delivered to the main battery 13.

Due to a decrease in battery efficiency with temperature and an increase in engine starting power requirements accompanying a decrease in temperature, an auxiliary or "B" battery 17 is electrically connected in series with the main battery 13 to supplement the main battery 13 during starting. The two series connected batteries 13 and 17 are connected from the common ground 14 through a starter solenoid 18 to a starting motor 19. When either the ignition switch 15 is turned to a "start" position or a separate start switch (not shown) connected between the key switch 15 and the solenoid 18 is closed, the solenoid 18 is energized to apply a high voltage from the two series connected batteries 13 and 17 to the starting motor 19 for cranking the truck engine. Other connections (not shown) are made from the ignition switch 15 to the ignition system and other electrical circuits in the truck. After the engine has started, the starting solenoid 18 is released by either turning the ignition switch 15 to an "on" or "run" position. Thereafter, the auxiliary battery 17 is not used until the truck engine must be restarted. Since the auxiliary battery 17 is not normally used while the truck engine is running, it cannot be charged directly by the alternator 16 when the battery 13 is charged since the alternator 16 only supplies twelve volts for charging the main battery 13. Therefore, the converter 10 is connected for charging the auxiliary battery 17 from the alternator 16 and main battery 13.

The converter 10 is connected to the existing truck electrical system 12 at the dashed line 11. The connection may be made by any suitable plug or terminals. Connections between the converter 10 and the electrical system 12 includes the common ground connection 14, a connection 20 to the negative or hot terminal of the main battery 13, a connection 21 to the negative or hot terminal of the auxiliary battery 17 which is connected to the solenoid 18 and a connection 22 to the "on" terminal of the key switch 15.

The converter 10 is provided with circuitry to prevent operation except when the main battery 13 and the auxiliary battery 17 are connected in the proper polarity and the key switch 15 is in the "on" position. When the key switch 15 is in the "on" position, power from the main battery 13 is applied through the connection 22 and a resistor 23 to turn on a transistor switch 24. When the transistor switch 24 conducts, power from the series connected batteries 13 and 17 is applied from the connection 21 to energize a relay coil 25, thereby closing relay contacts 25a. The relay contacts 25a connect a power buss 26 to the hot connection 20 from the main battery 13. A diode 27 is connected in series between the ground connection 14 and one side of the relay coil 25. The diode 27 is oriented to prevent actuation of the relay coil 25 in the event of a reverse connection in the batteries 13 and/or 17. A diode 29 is connected in parallel with the relay coil 25 to suppress transients at turn-off and thus protect the transistor 24 from high voltages.

When the key switch 15 is in the "on" setting and power is applied through the relay contacts 25a to the buss 26, a free running multivibrator 30 is energized. The multivibrator 30 includes a pair of transistors 31 and 32. The emitters of the transistors 31 and 32 are connected together to the buss 26. The collector of the transistor 31 is connected through a resistor 33 to ground 14 and through a capacitor 34 to the base of the transistor 32. In a similar manner, the collector of the transistor 32 is connected through a resistor 35 to ground 14 and through a capacitor 36 to the base of the transistor 31. The base of the transistor 31 is also connected through a resistor 37 to ground 14 and the base of the transistor 32 is connected through a resistor 38 to ground 14.

During operation of the multivibrator 30, the transistors 31 and 32 will alternately conduct. The duration during which the transistor 31 conducts is determined by the time constant of the RC circuit composed of the resistor 38 and the capacitor 34 and the duration during which the transistor 32 conducts is determined by the RC time constant of the resistor 37 and the capacitor 36. Normally, the resistors 37 and 38 have the same value and the capacitors 34 and 36 have the same value such that both transistors 31 and 32 conduct for equal time intervals.

The collector of the transistor 31 is connected through a resistor 39 to the base of a transistor 40. The collector of the transistor 40 is connected to the base of a transistor 41 and through a bias resistor 42 to ground 14. The emitters of the transistors 40 and 41 are connected to the buss 26. The transistors 40 and 41 comprise a pre-amplifier which supplies the drive current for a pair of transistors 43 and 44 connected in a Darlington configuration. The common connection between the pre-amplifier transistor 41 and the power transistor 43 is connected through a resistor 45 to ground 14. The emitter of the transistor 43 is connected to the base of the transistor 44 and also through a resistor 46 to the buss 26. When the power transistors 43 and 44 are conducting, power flows from the buss 26 through one side of a center tapped primary winding 47 of a power transformer 48. The primary winding 47 has a center tap 49 connected through a current sensing resistor 50 to ground 14.

A similar connection is made from the transistor 32 in the multivibrator 30 so that the circuitry for exciting the primary winding 47 is symmetrical. The collector of the transistor 32 is connected through a resistor 51 to the base of a transistor 52. The collector of the transistor 52 is connected through a resistor 53 to ground 14 and also to the base of a transistor 54. The emitters of the transistors 52 and 54 are connected to the power buss 26. The transistors 52 and 54 comprise a pre-amplifier for driving a pair of power transistors 55 and 56 connected in a Darlington configuration. The collector of the transistor 54 is connected through a resistor 57 to ground 14 and also to the base of the power transistor 55. The emitter of the transistor 55 is connected to the base of the transistor 56 and through a resistor 58 to the buss 26 and the emitter of the transistor 56 is connected directly to the buss 26. The collectors of the power transistors 55 and 56 are connected together to the second half of the primary winding 47 on the power transformer 48. When the power transistors 55 and 56 are conducting, power flows between ground 14 and the power buss 26 through the current sensing resistor 50, the primary winding 47 and the transistors 55 and 56.

From the above description, it will be apparent that as the transistors 31 and 32 alternately conduct during operation of the multivibrator 30, power will be applied alternately to opposite sides of the primary winding 47 of the power transformer 48. Power is supplied to such sides of the primary winding 47 by alternate conduction of the Darlington connected power transistors 43 and 44 connected to one side of the primary winding 47 and of the Darlington connected power transistors 55 and 56 on the opposite side of the primary winding 47. In view of the low current output from the RC multivibrator 30, the pre-amplifier consisting of the transistors 40 and 41 is required for driving the power transistors 43 and 44 and the pre-amplifier consisting of the transistors 52 and 54 is required for driving the power transistors 55 and 56.

In operation, the output from the multivibrator 30 applied alternately to the pre-amplifying transistors 40 and 41 and to the pre-amplifying transistors 52 and 54 has a relatively slow rise time and a relatively fast fall time due to the influence of the timing capacitors 34 and 36. The voltage coupling to the pre-amplifiers through the resistors 39 and 51 therefore causes the power stages to turn on relatively slowly. Since the turn on times of saturated transistors are faster than their turn off times, the slow turn on signal is desirable for assuring that only one of the pair of power transistors 43 and 44 or 55 and 56 is conducting at any given time, allowing sufficient time for the opposite pair to turn off. If both pairs of transistors should conduct at the same time, undesirable losses will occur within the transistors 43, 44, 55 and 56 and within the core of the transformer 48.

The power transformer 48 is provided with a center tapped secondary winding 59. A center tap 60 from the secondary winding 59 is applied through the connection 21 to the negative terminal of the auxiliary battery 17. The opposite ends of the secondary winding 59 are connected through rectifiers 61 and 62, respectively, to the power buss 26. As previously indicated, the power buss 26 is connected through the relay contacts 25a and the connection 20 to the positive terminal of the auxiliary battery 17. Thus, the full wave rectified output from the power transformer 48 is applied across the auxiliary battery 17 for charging such battery.

Whenever the multivibrator 30 is operating, power will be applied to the transformer 48 and the auxiliary battery 17 will be charged. Without further controls, the charging current applied to the auxiliary battery 17 will depend upon the voltage appearing across the auxiliary battery 17, which is a function of the state of the battery charge. This is due to the fact that the voltage across the auxiliary battery 17 will normally reverse bias the rectifiers 61 and 62. Current will be supplied to the auxiliary battery 17 only as long as the voltage across either of the rectifiers 61 or 62 from the secondary winding 59 exceeds the voltage of the auxiliary battery 17. If the auxiliary battery 17 is in a low state of charge, the back bias on the rectifiers 61 and 62 will be relatively low and a heavy charging current will be applied to the auxiliary battery 17. However, the voltage across the auxiliary battery 17 will increase as such battery becomes charged. With such an increase, there will be an increase in the back biasing of the rectifiers 61 and 62 and consequently a decrease in the charging current.

In addition to providing a tapered charge to the auxiliary battery 17, circuitry is provided for limiting the maximum output of the converter 10. This circuitry prevents applying an excessive current to the auxiliary battery 17 should such battery 17 have an extremely low charge or should the battery 17 be defective in that one or more cells are short circuited. Current limiting circuitry also provides the advantage of limiting the output of the converter 10 should a short circuit occur. The current limiting circuitry is controlled in response to the voltage appearing across the current sensing resistor 50. Such voltage is applied through a resistor 63 to the base of a transistor 64. The emitter of the transistor 64 is connected to ground 14 and the collector is connected through a resistor 65 to a junction 66. The junction 66 is connected through a diode 67 to the base of the transistor 31 and through a diode 68 to the base of the transistor 32. At the instant the current in either half of the primary winding 47 of the power transformer 48 should reach a predetermined maximum, the transistor 64 is biased into a conducting state to decrease the effective values of the timing resistor 37 and the timing resistor 38 by connecting the resistor 65 in parallel, thereby causing the multivibrator 30 to change operating frequency. When the multivibrator 30 changes frequency, the current flowing in the primary winding 47 is limited to a predetermined level.

As the power demand from the converter 10 increases and the current sensing resistor 50 and the transistor 64 limit the primary current in the transformer 48, the frequency of the multivibrator 30 increases. Variations in the frequency of the multivibrator under normal and under overload operating conditions may vary on the order of as much as 1:3 or more. The actual upper operating frequency of the multivibrator 30 is limited by the lumped impedance of the transformer 48 with the secondary winding 59 shorted. As the frequency increases, the increasing reactance of the transformer 48 represents the load on the power transistors 43 and 44 during one half cylce and on the power transistors 55 and 56 during the other half cycle of operation of the multivibrator 30.

The actual mode of operation of the converter 10 while charging the auxiliary battery 17 is determined by the selection of the current sensing resistor 50. The resistor 50 may be selected such that the converter 10 normally operates in an overcurrent condition while charging the battery 17. Under these conditions, the current sensing resistor 50 and the transistor 64 will limit the peak currents in the power stages during each half cycle. Since the output current from the transformer 48 is a function of the primary current, the converter 10 will approach a current source wherein a nearly constant charging current is supplied to the auxiliary battery 17. If the auxiliary battery's terminal voltage is low due to a discharged battery, the converter's output voltage is high enough so that the current limitation becomes effective. With a recovering battery, the terminal voltage rises until at some point determined by the resistor 50 and the internal resistance of the battery 17, the overcurrent sensor ceases to operate. The converter 10 still delivers a relatively high, almost constant current to the auxiliary battery 17 at the time the overcurrent sensor becomes ineffective.

If a tapered charging current is desirable at all times, the current sensing resistor 50 is selected such that a predetermined maximum charging current flows into a discharged or low auxiliary battery 17 without triggering the transistor 64 of the overcurrent sensor. As the terminal voltage on the battery 17 increases, it partially reverse biases the rectifiers 61 and 62 which then results in a decreasing charging current towards the end of the charging time. The overcurrent sensor then comes into operation only for accidental shorting of output leads of the converter 10 or in the case of a shorted cell in the auxiliary battery 17. The converter 10 therefore has the advantage of a high current limitation without requiring additional high current circuitry. Furthermore, any unbalance in the converter 10 is automatically corrected by the current limiting feature due to the symmetrical system.

As previously indicated, it is desirable to supply some type of charge to the auxiliary battery 17 after it has been fully charged to maintain it in a charged state. If the charge should be continuous over a long time or high, there will be excessive water loss from the battery 17 which may eventually damage the battery if not replaced. In the converter 10, the battery 17 is maintained in a fully charged state by switching the converter 10 off when the voltage across the auxiliary battery 17 exceeds a predetermined maximum and by switching the converter 10 back on again when such voltage drops below a voltage less than the predetermined maximum voltage. For example, if the auxiliary battery 17 consists of a 12-volt battery or two series connected 6-volt batteries for obtaining twelve volts, the converter 10 may be switched off when the voltage across the battery 17 reaches 14.5 volts and on again when the voltage across the battery 17 drops to 13.2 volts. Using these trigger voltages and assuming that the battery 17 is relatively new, the on-off cycle of the converter 10 may be on a time ratio of about 1:30 with the converter 10 remaining off 30 times longer than on. As the battery 17 ages and the internal leakage current increases, the time ratio may drop to 1:20 or less. The on-off cycling of the converter 10 provides a better method of controlling the converter 10 for maintaining the auxiliary battery 17 in a fully charged state than providing for a constant low "trickle" charge current. Trickle charging can be difficult to accurately regulate since the charging current is a function of the input voltage which in turn is related to the setting of the alternator regulator. This is not fully predictable since the regulator setting may be made by the customer. On-off converter cycling, on the other hand, is controlled by the battery voltage.

The voltage sensing circuitry includes a pair of transistors 69 and 70 and a zener diode 71. The connection 20 from the junction between the batteries 13 and 17 is connected to the emitters of the transistors 69 and 70. The collector of the transistor 69 is connected through a resistor 72 to a junction 73 in a voltage divider comprising three resistors 74, 75 and 76 connected in series between the connections 20 and 21. The collector of the transistor 70 is connected to the base of the transistor 69 and also through a resistor 77 to the connection 21 leading to the negative terminal of the auxiliary battery 17. A capacitor 78 is connected between the base and collector of the transistor 70. The base of the transistor 70 is also connected through a resistor 79 to the connection 20 leading to the positive terminal of the auxiliary battery 17 and through the zener diode 71 to a junction 80 between the resistors 74 and 75 of the voltage divider. The zener voltage of the diode 71 and the values of the resistors 74, 75 and 79 are selected to provide a desired temperature dependent slope to the voltage sensor.

The voltage sensing circuitry switches the converter on and off by controlling base bias voltages on the pre-amplifier transistor 40 and the pre-amplifier transistor 52. The collector of the transistor 69 of the voltage sensing circuitry is connected through a resistor 81 to the base of the transistor 40 and through a resistor 82 to the base of the transistor 52. During a charging cycle of the converter 10, the transistor 69 is conducting and the transistor 70 is non-conducting. Conduction by the transistor 69 places the collector of the transistor 69 at substantially the voltage appearing on the connection 20 to the positive terminal of the auxiliary battery 17. When the voltage on the auxiliary battery 17 reaches a predetermined maximum, such as 14.5 volts, transistor 70 is switched into a conducting state to turn off the transistor 69. At this time, a negative voltage from the voltage divider junction 73 is applied through the resistor 72 and the resistor 81 to the base of the pre-amplifier transistor 40 and through the resistor 72 and the resistor 82 to the base of the pre-amplifier transistor 52. With a negative reverse bias on the bases of the transistors 40 and 52, the multivibrator 30 is inhibited from controlling the pre-amplifier transistors and the power transistors for supplying power to the primary winding 47 of the transformer 48.

The connection of the collector of the transistor 69 through the resistors 76 and 72 induces the required hysteresis effect in the voltage sensing circuitry. The hysteresis effect provides the desired voltage range between the predetermined maximum voltage at which an output from the converter 10 is inhibited and the lower battery voltage at which the converter 10 is again operative. This voltage range may be readily changed to meet the needs of the auxiliary battery by changing the value of the voltage divider resistor 75. It will, therefore, be appreciated that by varying the resistor 75, as well as the other resistors 74 and 76 in the voltage divider, both the upper or predetermined high battery voltage at which the converter 10 is switched off and the lower voltage at which the converter 10 is again operative may be set at any desired level. By also selecting a predetermined current sensing resistor 50, the converter 10 may be switched on and off while the charging current is at or above the predetermined maximum or when the charging current is at some lower value. The current sensing resistor 50 also may be selected to meet the demands of the auxiliary battery 17, which may depend upon the ampere-hour rating of the battery.

For the above-described embodiment of the converter 10, it has been assumed that the truck electrical system 12 has a positive ground. Thus, the main battery 13 has its positive terminal connected to ground 14 and the negative terminal of the series connected auxiliary battery 17 is connected through the solenoid 18 to the starting motor 19. It will be appreciated that the converter 10 may be readily modified for use with a truck or other system having a negative electrical ground. The converter 10 may also be adapted for use with various voltage systems. For example, the main battery 13 may consist of a 12-volt battery while the auxiliary battery 17 may consist of a 6-volt battery for providing a total of 18 volts to the starting motor 19. Or, the auxiliary battery 17 may consist of two series connected 6-volt batteries or a single 12-volt battery. As used herein, the term "battery" is intended to cover one or more series or parallel connected batteries for providing a desired output voltage and current. It also will be appreciated that various changes and modifications may be made in the above-described converter 10 for charging an auxiliary battery without departing from the spirit and the scope of the claimed invention.

What we claim is:

1. A converter for charging a battery from a direct current source comprising, in combination, a free running multivibrator having first and second periodic outputs, a transformer having primary and secondary windings, said primary winding having first and second winding portions, means for applying current from the source to said first primary portion during the first output from said multivibrator, means for applying current from the source to said second primary portion during the second output from said multivibrator, means for rectifying the output from said secondary winding to obtain a direct current for charging the battery, and means for increasing the operating frequency of said multivibrator as the output power from said transformer increases above a predetermined level.

2. A converter for charging a battery from a direct current source, as set forth in claim 1, wherein said frequency increasing means includes means for sensing the current in said primary winding, and switch means responsive to said sensed current exceeding a predetermined level for causing said multivibrator output to change.

3. A converter for charging a battery from a direct current source, as set forth in claim 2, and including means responsive to an increase in the voltage across the battery when the output power from said transformer is below said predetermined level for decreasing the charging current to the battery.

4. A converter for charging a battery from a direct current source, as set forth in claim 3, and further including means for sensing the voltage across the battery, and means for inhibiting current to said primary winding when the sensed battery voltage exceeds a predetermined high voltage.

5. A converter for charging a battery from a direct current source, as set forth in claim 4, wherein said inhibiting means includes means for continuing to inhibit current to said primary winding after the sensed battery voltage exceeds such high voltage until the sensed battery voltage drops to a predetermined voltage lower than such high voltage.

6. A converter for charging a battery from a direct current source, as set forth in claim 1, and including means responsive to an increase in the voltage across the battery when the output power from said transformer is below said predetermined level for decreasing the charging current to the battery.

7. A converter for charging a battery from a direct current source, as set forth in claim 1, and further including means for sensing the voltage across the battery, and means for inhibiting current to said primary winding when the sensed battery voltage exceeds a predetermined high voltage, said inhibiting means including means for continuing to inhibit current to said primary winding after the sensed battery voltage exceeds such high voltage until the sensed battery voltage drops below a predetermined voltage lower than such high voltage.

8. In a vehicle including a main battery for operating an electrical system within the vehicle, a charger for the main battery operated from the vehicle's engine and an auxiliary battery connected in series with the main battery for supplying a high voltage for starting the engine, a converter for charging the auxiliary battery comprising, in combination, a free running multivibrator having first and second periodic outputs, a transformer having primary and secondary windings, said primary winding having first and second winding portions, means for applying current from the main battery and charger to said first primary portion during the first output from said multivibrator, means for applying current from the main battery and charger to said second primary portion during the second output from said multivibrator, means for rectifying the output from said secondary winding to obtain a direct current for charging the auxiliary battery, and means for increasing the operating frequency of said multivibrator as the power from said transformer increases above a predetermined level.

9. A converter for charging an auxiliary battery in a vehicle, as set forth in claim 8, wherein said frequency increasing means includes means for sensing the current in said primary winding, and switch means responsive to said sensed current exceeding a predetermined level for causing said multivibrator output to change.

10. A converter for changing an auxiliary battery in a vehicle, as set forth in claim 8, and including means responsive to an increase in the voltage across the auxiliary battery when the output power from said transformer is below said predetermined level for decreasing the charging current to the auxiliary battery.

11. A converter for charging an auxiliary battery in a vehicle, as set forth in claim 8, and further including means for sensing the voltage across the auxiliary battery, and means for inhibiting current to said primary winding when the sensed battery voltage exceeds a predetermined high voltage, said inhibiting means including means for continuing to inhibit current to said primary winding after the sensed auxiliary battery voltage exceeds such high voltage until the sensed auxiliary battery voltage drops below a predetermined voltage lower than such high voltage.

* * * * *